Nov. 2, 1926.
1,605,685
H. MOCK
CAN
Filed April 4, 1925
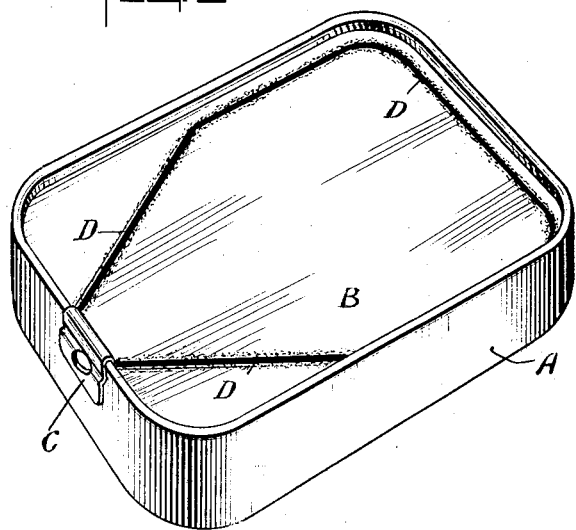
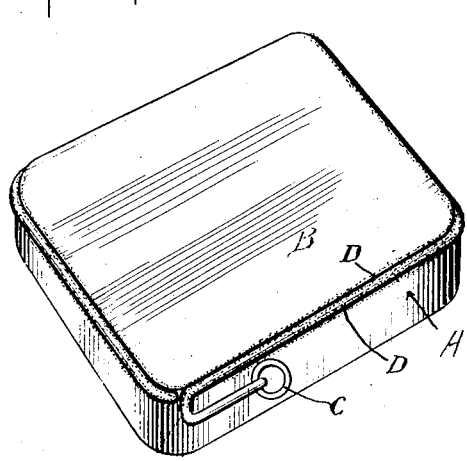
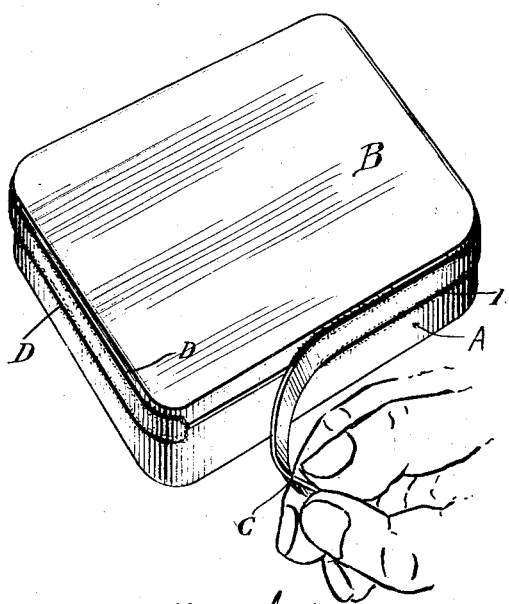
Hugo Mock INVENTOR Patented Nov. 2, 1926.

1,605,685

UNITED STATES PATENT OFFICE.

HUGO MOCK, OF NEW YORK, N. Y.

CAN.

Application filed April 4, 1925. Serial No. 20,605.

This invention relates to improvements in cans and more especially to the so-called "tin" cans used as hermetically sealed receptacles for preserved foods of all kinds, candies, tobacco, etc.

The present invention has for its primary object to provide a tin can which, while being sealed as effectually as those now in use, is so sealed that the same may be readily opened by the user without the employment of any extraneous appliance, and this most desirable result I attain by the employment of an easily-disruptable solder which serves to join the top to the can body.

Further objects of my invention will be apparent from the specification and drawings in which—

Figure 1 shows a perspective view of my can,

Figure 2 is another form, and

Figure 3 is a perspective view of the third form.

A shows the body of the can, B the separable portion or top thereof, C is the exterior means used to remove the portion B from the can and D indicates the line of solder used.

In Figure 1 an ordinary sardine can is illustrated in which the top B has integrally therewith the tab C. The top B is attached to the body of the can by the solder D which is employed in the same manner as the tin and lead solder commonly used on cans except that I employ for my purpose a special solder with the following formula: Lead 60%, tin 20%, bismuth 20%.

A solder of this composition will seal a can as effectually as the ordinary solder now used but has the property of being more readily disrupted than ordinary solder and is of a more brittle character than the solder commonly employed. By using a solder of this character, when the tab C as shown in Figure 1 is grasped, the top B can be detached from the body of the can without the employment of a key. In order to afford more leverage, a pencil, stick or other lever may be inserted through the hole in the tab C in Figure 1 and the pressure may be exerted against the body of the can by means of said stick or pencil which gives additional leverage.

In Figure 2 is illustrated a form of junction of the top B to the body A in which the same solder is employed over a wire which goes around the point of junction of the top and body and terminates in the tab C. To remove the top, the tab C is grasped and the solder may be disrupted along the entire line of junction of the body and the top.

In Figure 3, instead of the wire, a thin strip of metal is employed as the medium for joining the top and body of the can and a line of the solder above mentioned is used on both sides of this strip. The end of the strip of metal is left free to afford a handle by which the solder may be disrupted and the top of the can removed.

It is apparent that other tearable solders may be employed instead of the particular formula here mentioned, but in all cases an easily disruptable solder should be used to effect the purposes of this invention.

Having thus fully described my invention, what I claim is:—

A package comprising a hermetically sealed metallic can containing merchandise designed to be sold to the public in retail quantities, a top for said can, said top and can being soldered together with a solder readily disruptible and of no greater breaking strength than a solder of substantially the following formula: Lead 60%, tin 20%, bismuth 20%, and a rip member associated with said solder.

In testimony whereof I hereunto affix my signature.

HUGO MOCK.